United States Patent
Tore (10) Patent No.: US 6,870,893 B2
(45) Date of Patent: Mar. 22, 2005

(54) RECEIVER AND METHOD FOR AVOIDING INTERSYMBOL INTERFERENCE IN A HIGH SPEED TRANSMISSION SYSTEM

(75) Inventor: André Tore, Älvsö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 715 days.

(21) Appl. No.: 09/881,057

(22) Filed: Jun. 15, 2001

(65) Prior Publication Data

US 2002/0001355 A1 Jan. 3, 2002

Related U.S. Application Data (63) Continuation of application No. PCT/EP99/09197, filed on Dec. 16, 1998.

(30) Foreign Application Priority Data

Dec. 16, 1998 (DE) .......................... 198 58 106

(51) Int. Cl.$^7$ ................................. H04B 1/10
(52) U.S. Cl. ...................... 375/350; 375/348
(58) Field of Search ................. 375/350, 229, 375/230, 231, 232, 233, 234, 235, 236, 348

(56) References Cited

U.S. PATENT DOCUMENTS

| | | | | |
|---|---|---|---|---|
| 5,682,376 A | * | 10/1997 | Hayashino et al. | 370/206 |
| 6,115,354 A | | 9/2000 | Weck | |
| 6,226,322 B1 | * | 5/2001 | Mukherjee | 375/229 |
| 6,266,367 B1 | * | 7/2001 | Strait | 375/229 |
| 6,426,972 B1 | * | 7/2002 | Endres et al. | 375/229 |
| 6,526,105 B1 | * | 2/2003 | Harikumar et al. | 375/350 |

FOREIGN PATENT DOCUMENTS

| | | |
|---|---|---|
| DE | 43 19 217 C2 | 12/1994 |
| DE | 196 20 042 A1 | 11/1997 |
| EP | 0 689 314 A1 | 12/1995 |

(List continued on next page.)

OTHER PUBLICATIONS

Bingham, "Multicarrier Modulation for Data Transmission: An Idea Whose Time Has Come", IEEE Communications Magazine, May 1990, pp. 5–14.

TIEI.4/94–007R8, Asymetric Digital Subscriber Lane (ADSL) Metallic Interface, 4/94, pp. 45 and 58.

DTS/TM–06003–1 (draft), "Transmission and Multiplexing (TM); ACCESS Transmission Systems on Metallic Access Cables; Very High Speed Digital Subscriber Line (VDSL); Part 1: Functional Requirements", V.0.0.6 (Nov. 1997).

German Office Action dated May 15, 2002 and English Translation thereof.

*Primary Examiner*—Young T. Tse
*Assistant Examiner*—Sam K. Ahn
(74) *Attorney, Agent, or Firm*—Nixon & Vanderhye, P.C.

(57) ABSTRACT

The present invention relates to a receiver for a high speed transmission system and a method for receiving a signal on a receiving side of a transmission system wherein a first signal is transmitted over a transmission path. Said first signal comprises a plurality of data symbols which are successively transmitted, in front of each being a first prefix for avoiding an interference between said successively transmitted data symbols. The receiver according to the present invention comprises a filter having a pass characteristic such that said first signal can pass, a buffer for buffering said first signal, means for generating a second prefix for each first prefix in front of each of said plurality of data symbols replacing means for replacing said first prefix by said second prefix, said second prefix respectively having a length longer than that of said first prefix to be replaced. The invention finds application in DMT XDSL systems.

11 Claims, 9 Drawing Sheets

FOREIGN PATENT DOCUMENTS

| | | |
|---|---|---|
| EP | 0 719 004 A2 | 6/1996 |
| EP | 0 725 509 A1 | 8/1996 |
| EP | 0 729 250 A2 | 8/1996 |
| EP | 0 740 437 A1 | 10/1996 |
| EP | 0 762 701 A | 3/1997 |
| EP | 0 802 649 A1 | 10/1997 |
| EP | 0 806 852 A | 11/1997 |
| EP | 196 18 561 A1 | 11/1997 |
| EP | 0 829 988 A2 | 3/1998 |
| EP | 0 829 988 A | 3/1998 |
| EP | 0 929 172 A | 7/1999 |
| WO | 97/30531 | 8/1997 |

* cited by examiner

COPY END OF SENT SYMBOL

PREFIX  DMT SYMBOL

FIG.11b

TRANSIENT

FIG.12

TRANSIENT

TRANSIENT

FIG.13

RECEIVER AND METHOD FOR AVOIDING INTERSYMBOL INTERFERENCE IN A HIGH SPEED TRANSMISSION SYSTEM

This application is a continuation of PCT Application No. PCT/EP99/09197, filed Dec. 16, 1998.

The present invention relates to a receiver according to the preamble of claim 1 and to a method for receiving a signal on a receiving side of a transmission system, said signal comprising a plurality of data symbols having a prefix for avoiding an interference of successively transmitted data symbols caused by transients filtered by the transmission path.

TECHNOLOGICAL BACKGROUND

ADSL (Asymmetrical High Speed Digital Subscriber Line) and VDSL (Very High Speed Digital Subscriber Line) systems, usually referred to as xDSL-systems use an ordinary telephone line to transmit digital data at high speed. This is done in overlay on the analogue POTS (Plain Old Telephone Service) service. Thanks to xDSL, telephone companies can re-use most of their installed wiring for the introduction of new services. The xDSL-system uses a higher frequency band than an ordinary telephone service or an ISDN (Integrated Services Digital Network) service.

Figure 9:
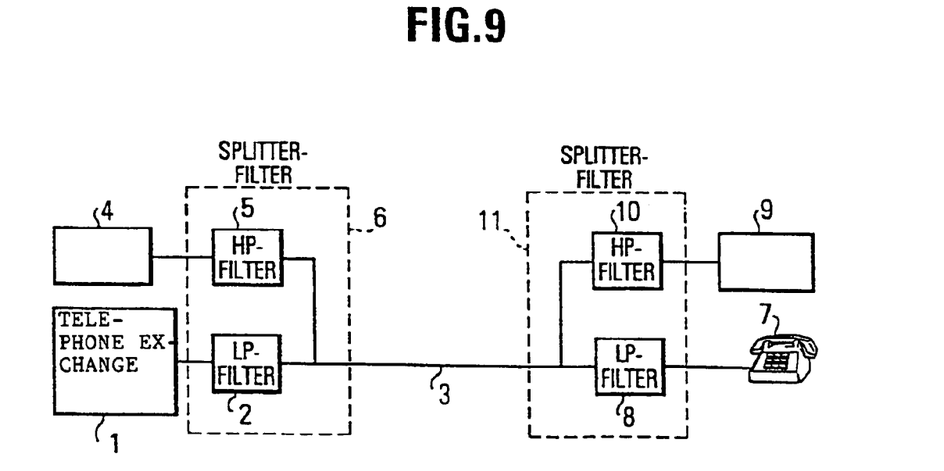
FIG. 9 shows the basic structure of a xDSL system.

The basic structure of such a XDSL system is shown in FIG. 9. Reference number 1 in FIG. 9 designates a telephone exchange, which is connected to a transmission path 3 via a first LP (low pass) Filter 2. A first XDSL modem 4 is connected on the telephone exchange side to said transmission path 3 via a first HP (high pass) Filter 5. Said first LP-Filter 2 and said first HP-Filter 5 form a first splitter filter 6 which is used for separating the telephone or ISDN service from a signal transmitted over said transmission path 3 by said XDSL system. Said transmission path 3 can be e.g. a twisted-pair subscriber line.

On the subscriber side, there is provided a subscriber terminal 7 such as a telephone which is connected to said transmission path 3 via a second LP Filter 8. A second XDSL modem 9 is connected to said transmission path 3 via a second HP Filter 10. Said second LP Filter 8 and said second HP Filter 10 form a second splitter filter 11 used for separating the telephone or ISDN service from the signal transmitted by said xDSL system.

Figure 10:
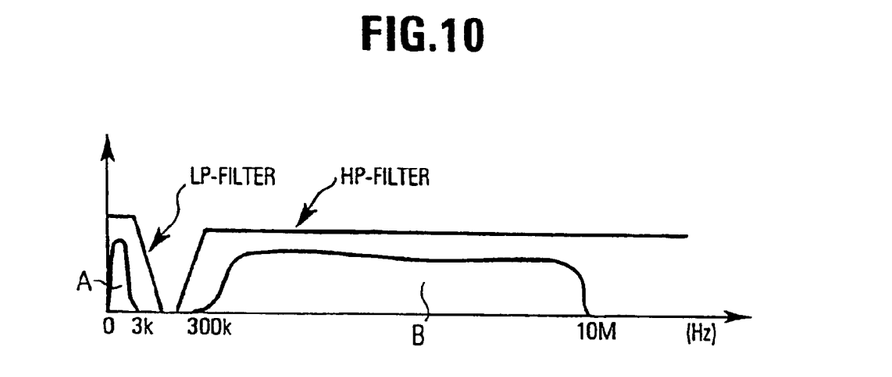
FIG. 10 shows the frequency bands used by VDSL Systems and telephone or ISDN services.

The relationship of the frequency bands used for the telephone or ISDN services and a VDSL system is shown in FIG. 10. Reference character A indicates the frequency band used for the transmission of speech in the telephone service or used by the ISDN service. In the case of the telephone service, the frequency band A ranges from 0 Hz to 3 kHz and in the case of the ISDN service from 0 Hz to 160 kHz. The frequency band used by the VDSL system is indicated with reference character B. As shown in FIG. 9, this frequency band ranges from 300 kHz to 10 MHz.

The characteristics of said first and second splitter filters 6 and 7 have to be such that the respective LP Filter 2 or 8 has such characteristics that said telephone or ISDN service may pass, but the frequency band B used by the xDSL system is suppressed. The characteristic of the respective HP Filter 5 or 10 has to be such that the frequency band B used for the data transmission at high speed by said xDSL systems may pass, but said frequency band A used by said telephone or ISDN service is suppressed.

A modulation scheme standardized for ADSL (defined in the ANSI standard on ADSL, entitled "Asymmetric Digital Subscriber Line (ADSL) Metallic Interface Specification", published by the American National Standards Institute Inc. (ANSI)) and suggested for VDSL is called DMT (Discrete Multi Tone) modulation. In DMT systems, data symbols are modulated on a plurality of carriers (preferably a set of 256 carriers with equidistant frequencies). This modulation is a QAM (Quadrature Amplitude Modulation) which is carried out on said plurality of carriers at the same time, which are then added together. The demodulation can be implemented as an FFT (Fast Fourier Transformation). The modulation can be implemented as an IFFT (Inverse Fast Fourier Transformation). The output from one IFFT calculation is called a DMT-symbol. A detailed description of the principles of DMT is given in J. A. C. Bingham, Multicarrier modulation for data transmission: an idea whose time has come, IEEE Communications Magazine, May 1990, pp. 5–14.

A problem occurring in such DMT-systems with respect to the HP-Filters used in such xDSL-systems is that the HP-Filters 5 and 10 used in the xDSL-signal path must be of a high order to ensure a clear separation from the telephone or ISDN service. These filters have a long impulse response that may cause the successively transmitted DMT symbols to interfere with one another. A DMT symbol input to the HP filter causes transients in said filter. If the transients have not died out before the next DMT symbol is input, these transients produce distortions in the next symbol that let one DMT-symbol interfere with the successive one (intersymbol interference).

EP 0 802 649 A1 suggests a solution for compensating for intersymbol interference caused by transients filtered in the transmission path. A prefix and/or suffix and/or symbol extension is inserted in front of each DMT-symbol before transmission of the DMT-symbol over the transmission path. To fully compensate for intersymbol interference, the length of this prefix and/or suffix and/or symbol extension equals at least the length of the equalized channel impulse response of the respective transmission path.

EP 0 725 509 A1 suggests to use a prefix having p-bits (p being an integer) whose values are equal to the values of p-bits at the end of the respective data symbol.

Figure 11A:
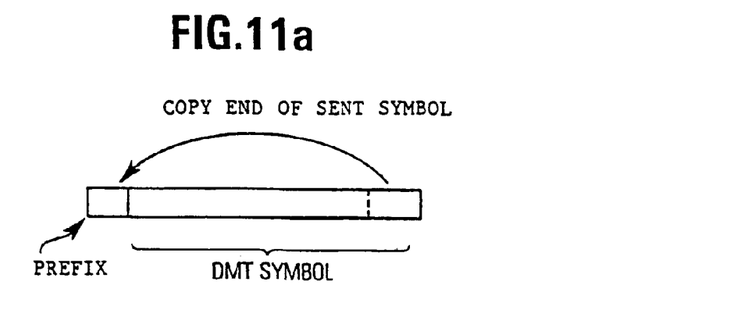
FIGS. 11a and 11b show DMT symbols with prefixes.

FIG. 11a shows such a DMT-symbol with a prefix which is arranged in front of said DMT-symbol. The prefix is a copy of the end of the DMT-symbol.

Figure 11B:
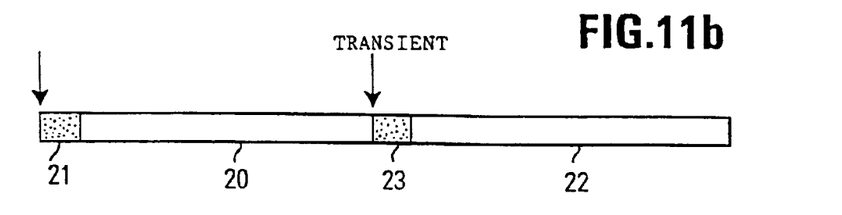

FIG. 11b shows two successively sent DMT-symbols 20 and 22, respectively having a prefix 21 and 23. In front of each of said prefixes 21 and 23, there are transients filtered in the transmission paths. The cause of these transients will be explained with more detail with reference to FIG. 12.

Figure 12:
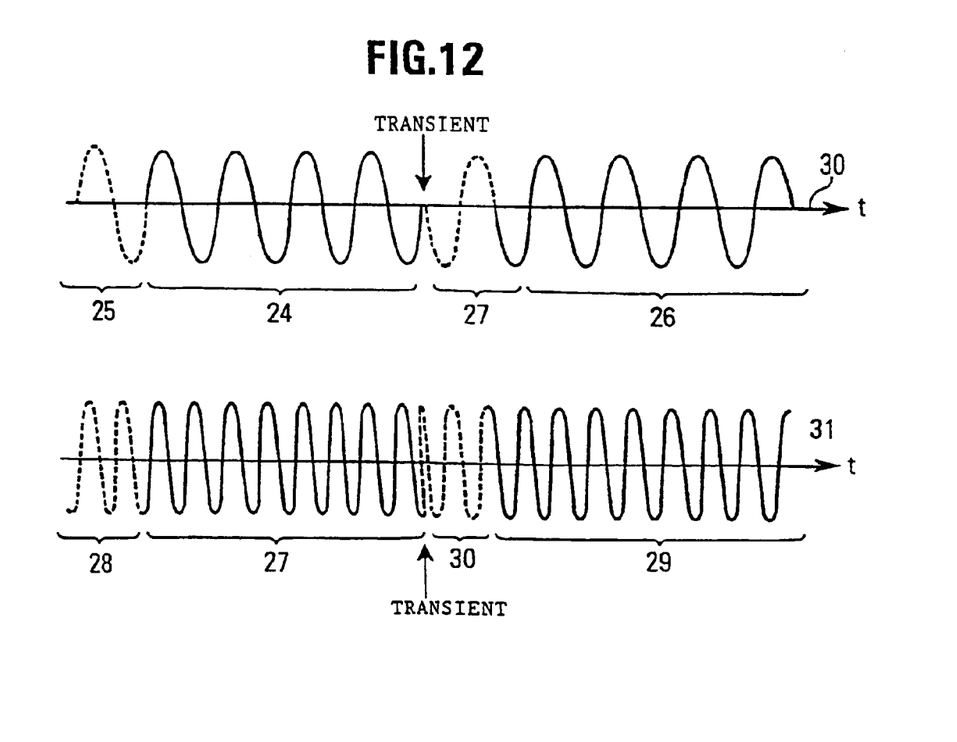
FIG. 12 shows two carriers of a DMT symbol.

FIG. 12 shows two of the plurality of carriers in a DMT-signal. The two carriers 30 and 31 have different frequencies. The first carrier 30 has a first frequency $f_1$ and the second carrier 31 has a second frequency $f_2$. Reference number 24 relates to a first DMT-symbol on said first carrier 30 with a prefix 25, followed by a second DMT-symbol 26 with a prefix 27.

Reference number 27 relates to a third DMT-symbol with a prefix 28, followed by a fourth DMT-symbol 29 with a prefix 30 on the second carrier 31. As should be understood from FIG. 12, all carriers will be continuous from the beginning of the cited prefix to the end of the respective DMT-symbol by selecting the end of the respective DMT symbol as the respective prefix.

It is furthermore indicated in FIG. 12 that the transients are caused by discontinuities in the carriers 30 and 31. FIG. 12 shows transients caused between the end of the DMT-symbols 24 and 27 and the beginning of the respective prefix 27 and 30 of the following DMT-symbol 26 and 29. By setting the length of the respective prefixes in front of said DMT-symbols 26 and 29 to a length with respect to the impulse response of the transmission path, it is thereby possible to avoid intersymbol interference since the transients caused by such a discontinuity will die out before the DMT-symbol 26 and 29, carrying the respective data, starts.

With an increase of the transmission rate, the requirements for the HP-Filter at the receiving side become more stringent, implying longer impulse responses for the HP-Filter especially on the receiving side. To avoid intersymbol interference, the lengths of the prefixes have to be extended.

An extension of the prefixes causes a reduction of the data throughput capacity of the transmission system since the transmission time required for the transmission of these prefixes increases. Thereby, the transmission time needed for the transmission of data and the resources occupied by the transmission are increased. Accordingly, in the design of such a xDSL-system transmitting DMT-symbols, there is a problem that the transmission rate is limited and a compromise or trade-off has to be found between the transmission rate, the requirements for the HP-Filter at the receiving side and the length of the prefixes in front of the DMT-signals.

Figure 13:
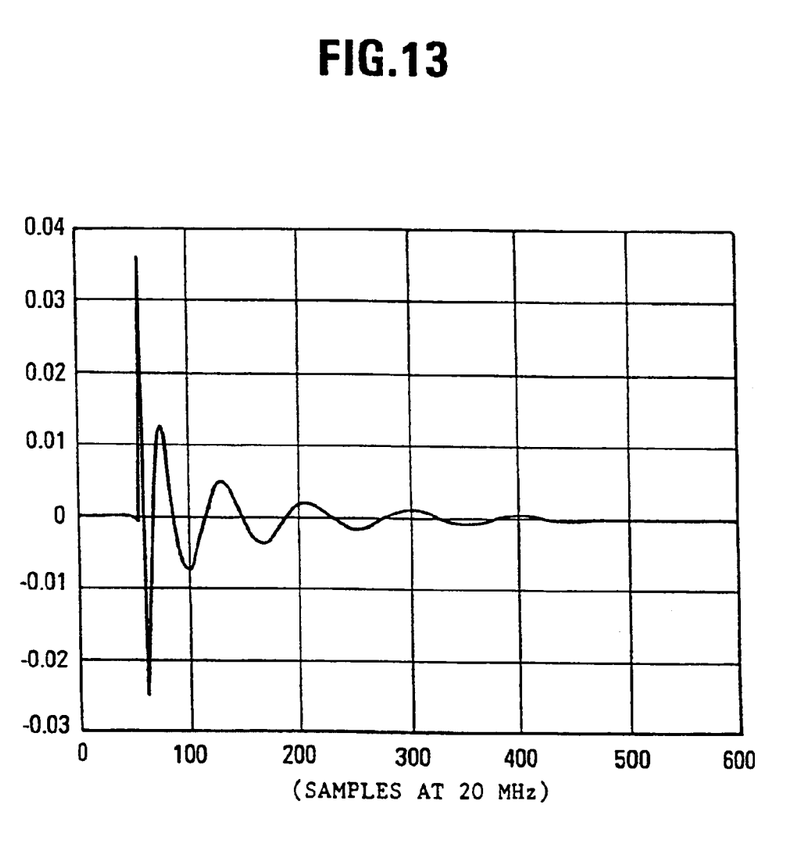
FIG. 13 shows an example of a total impulse response of a VDSL signal path including sharp HP-filters.

FIG. 13 shows the impulse response of a VDSL-signal path including HP-Filters. In case of the transmission path shown in FIG. 13, it takes nearly 450 samples until the impulse response has completely died out. A compromise in this case would be that the prefix has a length of 32 to 128 samples.

EP 0 829 988 A2 describes symbol synchronization and sampling frequency adjustment in an OFDM receiver wherein the pulse response of a radio channel is determined and a guard interval is set in the receiver such that it covers the most significant components of the pulse response. A slow and monotonous temporal shift of the pulse response between measurement rounds indicates an error in the sampling frequency which is thereafter compensated for.

WO 97/30531 A1 describes a transmitter arranged to insert a guard space in data bursts to be transmitted and being able to adjust the duration, that is the length of the inserted guard space. A receiver may be adapted to produce a guard space of a minimum duration necessary to prevent data loss caused by delay spread.

EP 0 923 172 A1, published on Jul. 14, 1999, describes a multicarrier modulation system with variable symbol rates wherein in fallback modes an increased guard time is provided for a better delay spread tolerance and increased symbol length provides improved signal to noise performance. As described in claim 3 of document D5, a guard time is interposed between successive ones of the symbols, while the length of the guard time is greater for modes with a greater value of K.

It is, therefore, an object of the present invention to provide a receiver according to the preamble of claim 1 and a method for receiving a signal on a receiving side of a transmission system which allow to reduce intersymbol interference of data symbols received successively from a transmission path without reducing the throughput capacity of the transmission system.

This object is solved by a receiver with the features of claim 1 and a method with the features of claim 8.

On the receiving side a received first prefix in front of each data symbol is replaced by a second, longer prefix, which is locally generated on the receiving side of the transmission system. This locally generated second prefix allows that the transients caused by the filter on the receiving side have enough time to die out before the data symbol comprised in the signal sent over the transmission path is input to the filter.

This allows that an impulse response of a filter of a high order on the receiving side of the transmission system can be locally compensated without reducing or influencing the transmission rate on the transmission path.

The meaning of "to replace" in the context of the present application is not limited to a complete replacement of the first prefix by the second prefix. That is, the term "to replace" as used in the present application includes to replace only a part of the first prefix by the second prefix and not only the whole first prefix. In other words, it is possible to replace e.g. only the first or last 10 samples of the first prefix by the second prefix or to replace a suitable number of samples in the middle of the first prefix.

In an advantageous embodiment of the present invention, said second locally generated prefix is formed from a part of the data symbol in front of which said second prefix is used to replace said first prefix.

Due to this arrangement, it can be ensured that the carriers are continuous from the beginning of the second prefix to the end of the respective data symbol.

Further improvements and embodiments of the present invention become apparent from the dependent claims.

The invention may be more fully understood in conjunction with the accompanying drawings.

FIGS. 5b–5d show the frequency responses of the FIR-Filter portion, the IIR-Filter portion and of the whole filter shown in FIG. 5a.

In the following, a first embodiment of a receiver for a high speed transmission system according to the present invention is described with respect to FIG. 1. In this high speed transmission system, a signal is transmitted over a transmission path 30 from a sending side (not shown) to the receiver 31. Said signal comprises a plurality of data symbols which are sent over said transmission path 30 one after the other. In front of each of said data symbols, there is a first prefix. This first prefix is for avoiding an interference between the successively transmitted data symbols occurring due to transients filtered by the transmission path 30. The transmission path 30 is connected to a receiver 31 of the receiving side of the transmission system.

The receiver 31 comprises a buffer 32 for buffering the received signal. A means 33 for generating a second prefix is connected to said buffer 32 and to a replacing means 34 for replacing said first prefix sent with each said of said data symbols in said received signal. A filter 35 is provided which is connected to said buffer 32 and has its output 36 connected to a decoder (not shown) for decoding the data symbols. In case, the receiver is used in a xDSL system, said filter 35 is a HP (high pass) filter, preferably with sharp slopes.

Figure 1:
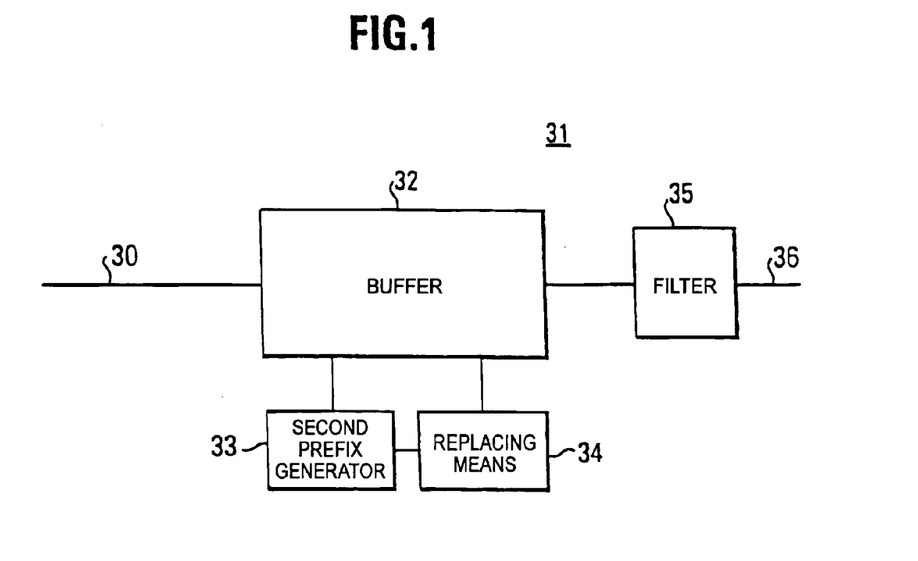
FIG. 1 shows a first embodiment of a receiver for a high speed transmission system according to the present invention.

The operation of the receiver according to the first embodiment described with reference to FIG. 1 is now described with reference to FIG. 2.

Figure 2:
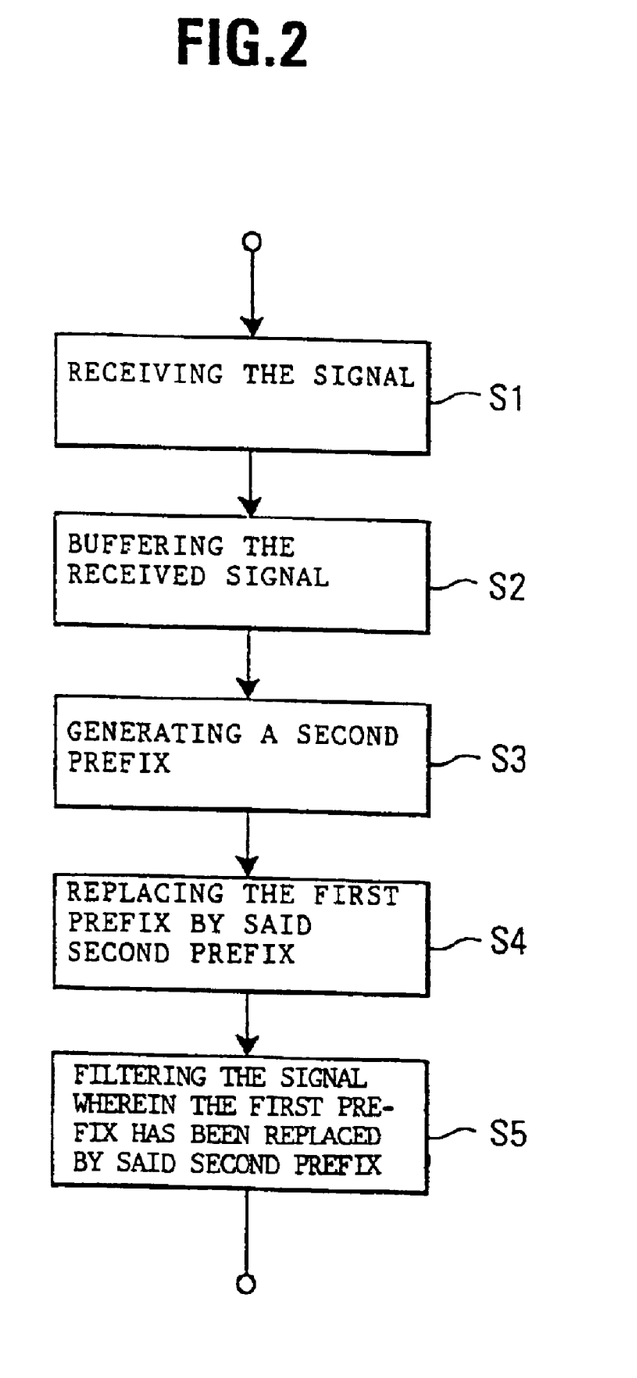
FIG. 2 is a flow-chart showing the operation of the receiver of FIG. 1.

In step S1 of the flow-chart of FIG. 2, the signal sent from a sending side over the transmission path 30 to the receiver 31 is received. The received signal is then buffered or stored in the buffer 32 in step S2. Then, in step S3 said means for generating a second prefix generates a second prefix for each first prefix in front of each of said plurality of data symbols contained in said received signal. This second prefix may have an individual length for each of the first prefixes to be replaced, but preferably has a fixed length for all first prefixes to be replaced based on the characteristics such as the impulse response of the filter 35. The generation of the second prefix is preferably done by taking a part of the respective data symbol the first prefix of which should be replaced, and to use this part as said second prefix to replace said first prefix. This part of the respective data symbol can be the end of the respective data symbol. In case said data symbol is a digital symbol, a number of samples from the end of said digital data symbol may be taken as second prefix such that the sample values of said second prefix having a length of n-samples are equal to the values of n-samples at the end of the respective data symbol.

Said means for generating a second prefix 33 generate said second prefix with a length corresponding to a parameter derived from an impulse response of said filter 35. Said second prefix may for example be generated with a length in accordance with a parameter relating to the time needed that transients of said filter 35 have died out to a level having no negative effect for the following data symbol such that an interference of data symbols sent one after another in said signal caused by transients of said filter 35 is avoided. Said means for generating a second prefix 33 can also determine the length of said second prefix in correspondence to a parameter relating to the time necessary that the impulse response of said HP-Filter 35 shows a predetermined attenuation, e.g. an attenuation of 40 dB and in correspondence with the frequency with which said data symbols are input to said filter 35.

Then, in step S4 the first prefix as sent with the respective data symbol in said signal is replaced by said second prefix generated in said step S3. It has to be noted that instead of replacing said first prefix by said second prefix, said replacing means 34 according to a variant of the first embodiment of the receiver can be adapted to add said second prefix to said first prefix or to insert said second prefix in said first prefix to thereby extend the first prefix. In case said data symbols and said first and second prefixes are digital signals, the sample values of the second prefix can be used to replace suitable sample values of the first prefix, e.g. the first 15 samples of the first prefix, or the sample values of the second prefix can be inserted in said first prefix at sample positions at the beginning, in the middle or at the end of the first prefix. Thereby, the first prefix can be either extended or replaced by a longer second prefix at the receiving side of the transmission system, i.e. in the receiver, without reducing the data transmission rate over the transmission path in spite of using a filter 35 on the receiving side with an impulse response that cannot be compensated for with the length of the first prefix.

Then, the sent signal, wherein the first prefixes in front of the respective data symbols have been replaced by said second prefixes, are filtered by means of said filter 35. The filtered signal can then be decoded by means of a decoder (not shown) or further processed in accordance with the modulation scheme used in the transmission system.

In case, the above-described receiver is used in a xDSL-system as described in detail in the introductory part of this application, said description being incorporated herewith into the description of the invention, the signal is transmitted over a transmission path, such as a twisted pair subscriber line simultaneously with other services, such as e.g. a telephone service or an ISDN (Integrated Services Digital Network) service. In this case, the above signal comprising a plurality of data symbols uses a different frequency band than that used by said telephone or ISDN service. The filter 35 used in such a system has a pass characteristic, such that a frequency band of said signal containing the data symbols can pass, but other frequency bands used e.g. by the telephone service or the ISDN service are suppressed.

If the above-described receiver is used in an ADSL or VDSL system using the DMT modulation scheme, as described in more detail in the introductory part of the present application, said data symbols correspond to DMT-symbols comprising a combined set of modulated carriers, wherein e.g. 2 samples of the data to be transmitted from the sending side to the receiving side of the transmission system, are modulated via 4 QAM (Quadrature Amplitude Modulation) on a first carrier, 8 samples are modulated e.g. via 256 QAM on a second carrier and so on such as described in the above referenced EP 0 802 649 A1.

Figure 3:
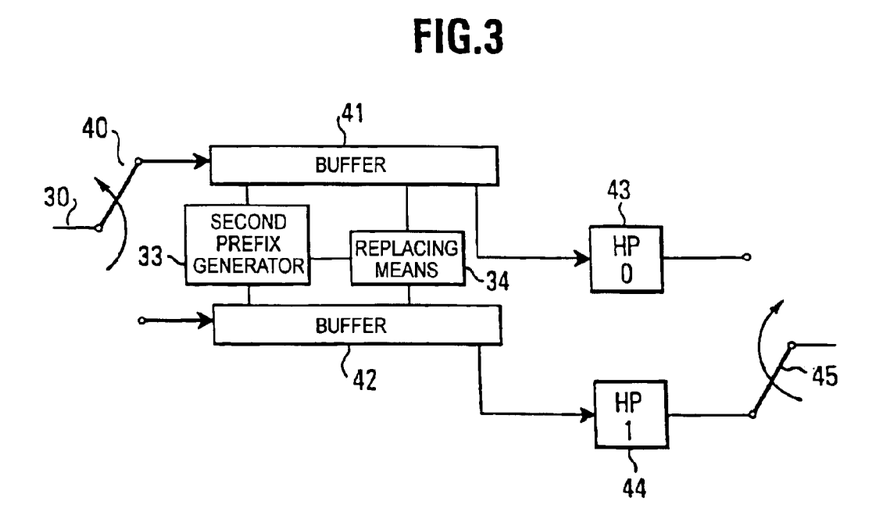
FIG. 3 shows a second embodiment of the receiver for high speed transmission system according to the present invention.

FIG. 3 shows a second embodiment of the receiver for a high speed transmission system according to the present invention. The receiver according to the second embodiment of the present invention comprises a first switching means 40 for connecting a first buffer 41 or a second buffer 42 to the transmission path 30. The first buffer 41 and the second buffer 42 are respectively connected to means for generating a second prefix 33 and replacing means 34 for replacing said first prefix by said second prefix, which are similar to the first embodiment described with reference to FIG. 1. The first buffer 41 can be connected to a decoder (not shown) via a first HP Filter 43 (HP 0 in FIG. 3) by means of a second switching means 45. Said second buffer 42 can also be connected to said decoder (not shown) via a second HP Filter 44 (HP 1) by means of said second switching means 45.

The operation of the second embodiment of the receiver according to the present invention is now described with reference to FIG. 4.

Figure 4:
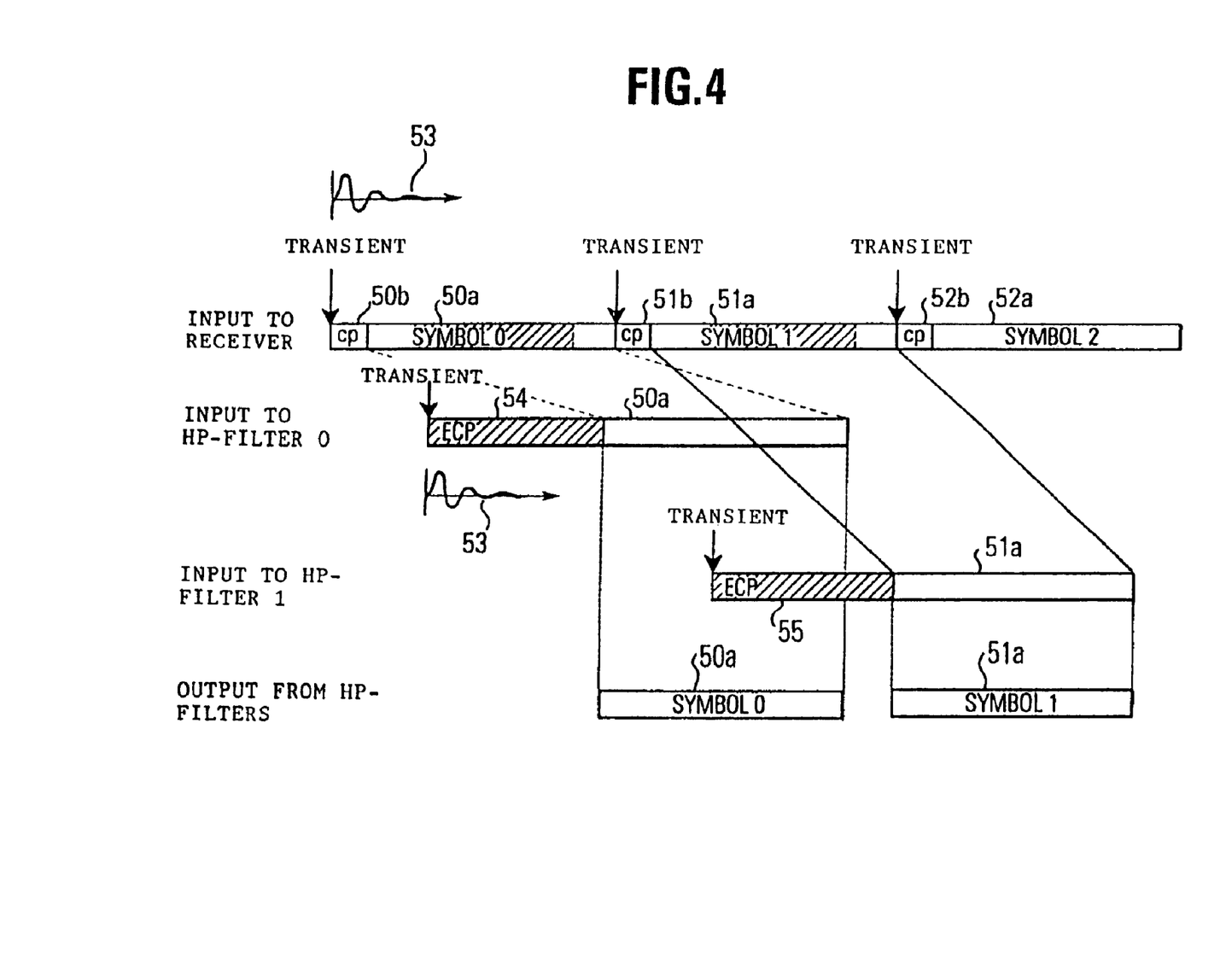
FIG. 4 shows a chart for explaining the operation of the receiver of FIG. 3.

The first line in FIG. 4 shows the received signal, which was sent over the transmission path 30 and input to the receiver. The received signal shown in the first line of FIG. 4 comprises three data symbols, namely symbol 0, symbol 1 and symbol 2, indicated with reference numbers 50a, 51a and 52a, respectively. In front of each of said data symbols 50a, 51a and 52a there is a respective first prefix cp, respectively indicated with reference numbers 50b, 51b, 52b.

As already explained in detail in the introductory part of this application, transients are caused at the beginning of each of said first prefixes 50b, 51b and 52b in said transmission path. In FIG. 4, it is assumed that the first prefixes 50b, 51b and 52b are sufficiently long for ensuring that transients of said transmission path 30 have already died out before said symbols 50a, 51a and 52a are transmitted and that there is no intersymbol interference caused in said transmission path 30.

Reference number 53 indicate small amplitude-time diagrams representing the impulse response of said first and second HP-Filters 43 and 44 (HP 0 and HP 1) for showing a dimensional comparison of the length of the first prefixes 50b, 51b and 52b, as contained in said signal transmitted over said transmission path 30 to the impulse response of the first and second HP-filters 43 and 44.

Said first switching means 40 switches said transmission path to said first buffer 41 and to said second buffer 42 alternately, such that successively transmitted data symbols 50a, 51a and 52a are alternately stored in said first buffer 41 and said second buffer 42. In other words, if the switching state shown in FIG. 3 is assumed, the data symbol indicated with reference number 50a in FIG. 4 is stored in said first buffer 41 together with the respective first prefix 50b. Then, said switching means 40 is switched to said second buffer 42, and the following symbol, namely the symbol indicated with reference number 51a in FIG. 4, is stored in said second buffer 42 together with the respective first prefix 51b. Then, said first switching means 40 is switched back to said first buffer 41 and the successively received data symbol, namely data symbol 52a in FIG. 4, is stored in said first buffer 41 together with the respective first prefix 52b.

Then, said means 33 for generating a second prefix generates a second prefix 54, 55 in the same manner as described with reference to FIG. 1 for of said first prefixes 50b, 51b and 52b stored in the first and the second buffer 41 and 42.

The replacing means 34 replaces said first prefixes 50b, 51b and 52b in the first and second buffer 41 and 42 by said second prefix 54, 55. It has to be noted, that, as described with reference to FIG. 1, said replacing means 34 can also be adapted to extend said first prefix 50b, 51b and 52b by inserting said second prefix 54, 55 into said first prefix 50b, 51b and 52b or to add said second prefix 54, 55 to the respective first prefix 50b, 51b and 52b.

As shown in line 2 of FIG. 4, the data symbol 50a is input to the first HP-Filter 43 with a second (or extended) prefix 54 (ECP) in front. The first prefix 50b has been replaced by said second prefix 54. It may be noted that in the context of the present invention, the term "replace" is to be understood broadly as relating to a suitable change in the prefix. The term does not imply that the first prefix has to be removed completely or the like, because the replacement can simply consist in an extension of the first prefix as indicated above. Naturally, it is also possible that the first prefix is removed completely before a new prefix is added.

As indicated with the hatched portion in data symbol 0 indicated with reference number 51a, and the hatched portion of said second prefix 54, a part of said data symbol 0 is used as said second prefix 54.

As shown with the impulse response of the HP filters HP 0 and HP 1 (reference numbers 43 and 44 in FIG. 3) illustrated with the amplitude-time diagrams 53, the second prefix 54 is long enough to ensure that the transient of the HP filter HP 0 has died out before the data symbol 50a is inserted to the HP filter HP 0.

As shown in line 3 of FIG. 4, the second symbol 1 carrying the reference number 51a is input to the second HP-Filter HP 1 carrying the reference number 44.

As indicated with the hatched portions in the data symbol 51a and the second prefix 55 in front of said data symbol 51a, parts of said data symbol 51a are used as said second prefix 55.

By alternately connecting said HP filters HP 0 and HP 1 to a decoder (not shown) by the second switching means 45, data symbols 50a and 51a are successively input to the decoder (not shown) and can be further processed in accordance with the respective modulation scheme.

Figure 5A:
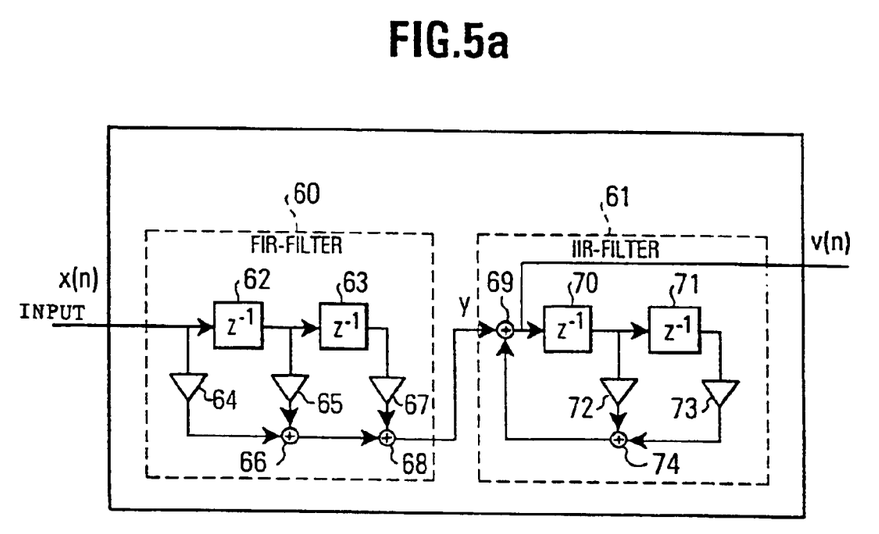
FIG. 5a shows an example of a second order HP-Filter comprising a FIR-Filter and an IIR-Filter.

FIG. 5a shows an example of an HP-Filter, which can be used as HP-Filters HP 0 and 1 in FIG. 3 (reference numbers 43 and 44) or as Filter 35 in FIG. 1. For the sake of clarity of illustration, this HP-Filter is of a low order. However, as is apparent for the skilled person, HP-Filters having a higher order can be used in order to better adapt the filter characteristics to the transmission path.

The high pass filter shown in FIG. 5a comprises a first filter portion constituted by an FIR-Filter 60 and a second filter portion constituted by an IIR-Filter 61. The FIR-Filter 60 and the IIR-Filter 61 are connected in series with each other.

The input of the FIR filter 60 is connected to a first one-sample delay element 62. The output of said first one-sample delay element 62 is connected to the input of a second one-sample delay element 63. The input of the FIR filter 60 is further multiplied by a coefficient $a_0$ by means of a first multiplier 64 and added to the output of the first one-sample delay element 62, which has been multiplied with a coefficient $a_1$ by means of a second multiplier 65, by means of a first adder 66. The output of the first adder 66 is added to the output of the second one-sample delay element 63, which has been multiplied with a coefficient $a_2$ by a third multiplier 67 by means of a second adder 68. The first and second one-sample delay elements 62 and 63, the first, second and third multipliers 64, 65 and 67 and the first and second adders 66 and 68 constitute the FIR-Filter 60.

The output of the FIR-Filter 60, namely the output of the adder 68 is input to a third adder 69, whose output is the output of the IIR-Filter 61 and whose output is input to a third one-sample delay element 70. The output of the third one-sample delay element is input to a fourth one-sample delay element 71. The output of the third one-sample delay element 70 and the fourth one-sample delay element 71 are respectively multiplied with coefficients $a_3$ and $a_4$ by means of a fourth multiplier 72 and a fifth multiplier 73, and then added by means of a fourth adder 74. The output of the fourth adder 74 is then added to the output of FIR-Filter 60 by means of said third adder 69.

The third and fourth one-sample delay elements 70 and 71, the fourth and fifth multipliers 72 and 73 and the third and fourth adder 69 and 74 constitute said IIR-Filter 61.

The FIR-Filter 60 can be described by the following equation with n being the time index, x(n) being the input of the Filter and y(n) being the output.

$$y(n)=a_0x(n)+a_1x(n-1)+a_2x(n-2);$$

The IIR-Filter 61 can be described by the following equation with n being the time index, y(n) being the input of the Filter and v(n) being the output.

$$v(n)=y(n)+a_3v(n-1)+a_4v(n-2);$$

The total impulse response of the high pass filter shown in FIG. 5a is obtained by convoluting the above two equation.

Accordingly, the total impulse response is longer than each of the individual impulse responses of the FIR- and the IIR-Filter as indicated with the above equations.

Figure 5B:
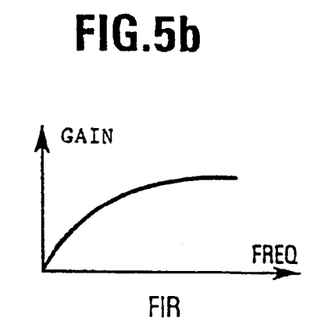
Figure 5C:
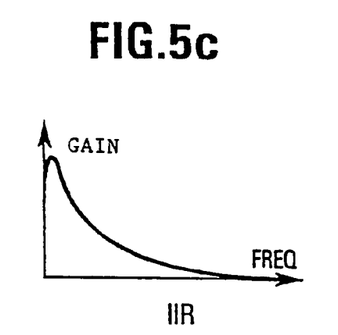
Figure 5D:
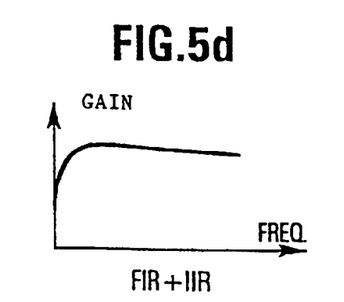

FIG. 5b shows the frequency response of the FIR-Filter 60, and FIG. 5c shows the frequency response of the IIR-Filter 61. The total frequency response of the HP filter shown in FIG. 5a is shown in FIG. 5d.

As apparent from FIGS. 5a–5d, the FIR-Filter 60 is a nonrecursive filter, which introduces zeros in the transfer function of the HP filter shown in FIG. 5a and attenuates the low frequencies. The impulse response thereof is finite.

The IIR-Filter 61 is recursive and introduces poles in the transfer function of the HP filter shown in FIG. 5a and compensates in this arrangement for the frequency response of the FIR-Filter 60, and flattens the frequency response in the pass band. The impulse response of the IIR-Filter 61 is infinite.

In case the HP filter in FIG. 5a is realized as a digital filter, the FIR-Filter 60 and IIR-Filter 61 can be separated.

Figure 6:
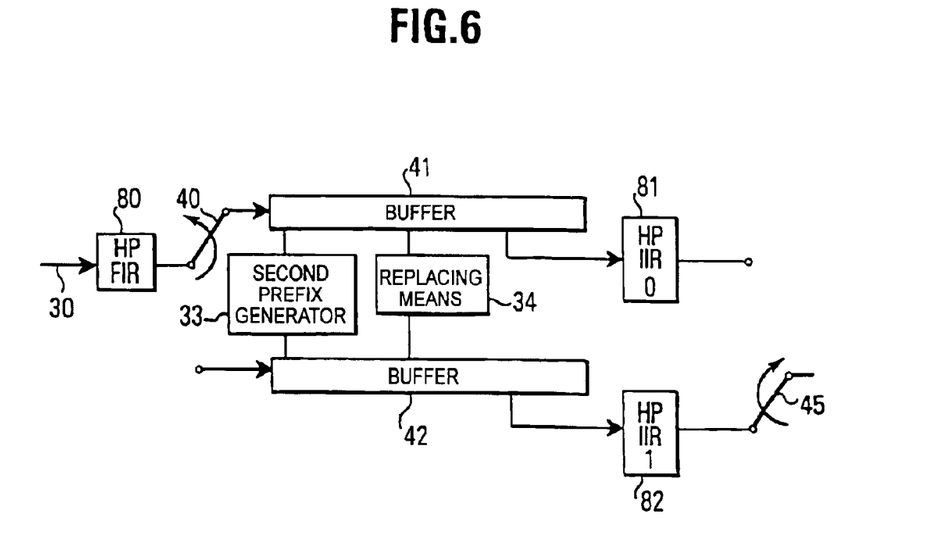
FIG. 6 shows a third embodiment of the receiver for high speed transmission system according to the present invention.

FIG. 6 shows the third embodiment of the receiver according to the present invention, using a HP filter comprising a recursive and a nonrecursive filter portion, such as the one described with reference to FIGS. 5a–5d.

FIG. 6 shows a third embodiment of the receiver according to the present invention which has a similar arrangement as the receiver according to the second embodiment described with reference to FIG. 3, except that the HP filters HP 0 and HP 1, indicated with reference numbers 43 and 44 in FIG. 3, are replaced by a HP filter having two filter portions, namely a recursive filter portion and a nonrecursive filter portion. This HP filter is constituted depending on the switching state of the first switching means 40 by a first filter portion HP FIR, indicated with reference number 80, which is arranged in front of said replacing means 34 with respect to the transmission path, and one of second filter portions HP IIR 0 and HP IIR 1, indicated with reference numbers 81 and 82 which are arranged behind said replacing means 34.

In FIG. 6, the first filter portion 80 (HP FIR) is arranged in front of said first switching means 40 and connected to said transmission path 30. Thereby, said first filter portion 80 (HP FIR) is used for both of said second filter portions 81 and 82 (HP IIR 0, HP IIR 1) for respectively forming a HP filter having a pass characteristic, such that the signal comprising said plurality of data symbols with a prefix in front of each can pass.

Said first filter portion 80 (HP FIR) is a nonrecursive filter such as the one indicated with reference number 60 in FIG. 5a and has a finite impulse response. Said second filter portions 81 and 82 (HP IIR 0 and HP IIR 1) are recursive filters such as the one indicated with reference number 61 in FIG. 5a and respectively have an infinite impulse response.

The first filter portion 80 (HP FIR) filters non-periodic low frequency disturbances from the signal received over the transmission path 30. Said second filter portions 81 and 82 (HP IIR 0 and HP IIR 1) respectively compensate for the frequency response of the first filter portion 80 (HP FIR) and respectively flatten the frequency response of the whole HP filter (constituted by HP FIR and HP IIR 0 or HP FIR and HP IIR 1, respectively) in the pass band.

With this arrangement an unwanted low frequency disturbance of said telephone or ISDN services can be separated from the signal containing said data symbols.

Figure 7:
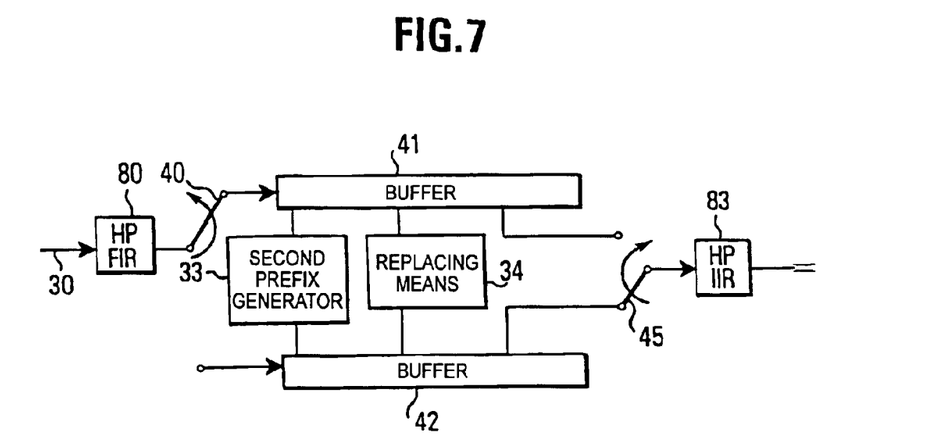
FIG. 7 shows a fourth embodiment of the receiver for a high speed transmission system according to the present invention.

FIG. 7 shows a fourth embodiment of the receiver according to the present invention. The receiver according to the fourth embodiment of the present invention is similar to the receiver according to the third embodiment of the present invention, described with reference to FIG. 6, except that said second switching means 45 is arranged between the outputs of said first buffer 41 and said second buffer 42 for alternately switching said outputs to a second filter portion 83 (HP IIR). The output of the second filter portion 83 is connected to a decoder (not shown) formed in accordance with the respective modulation scheme.

Said second switching means 45 are arranged to alternately connect said first and said second buffers 41 and 42 to said second filter portion 83 (HP IIR). Due to this arrangement, only one second filter portion 83 (HP IIR) has to be arranged allowing to reduce the complexity of the receiver and to reduce the manufacturing costs thereof.

It has to be noted that said first switching means 40 and said second switching means 45 switch with a certain frequency which is synchronized with the frequency of said data symbols in said received signal, if said data signals contained in said received signal are periodic. In case that the data symbols are not periodic, said switching means are controlled by means of a data symbol detecting means (not shown). This data symbol detecting means detects the data symbols or the first prefixes in front of said data symbols in said received signal and controls the switching of said first and second switching means 40 and 35 such that the switching is performed alternately after each data symbol.

Figure 8:
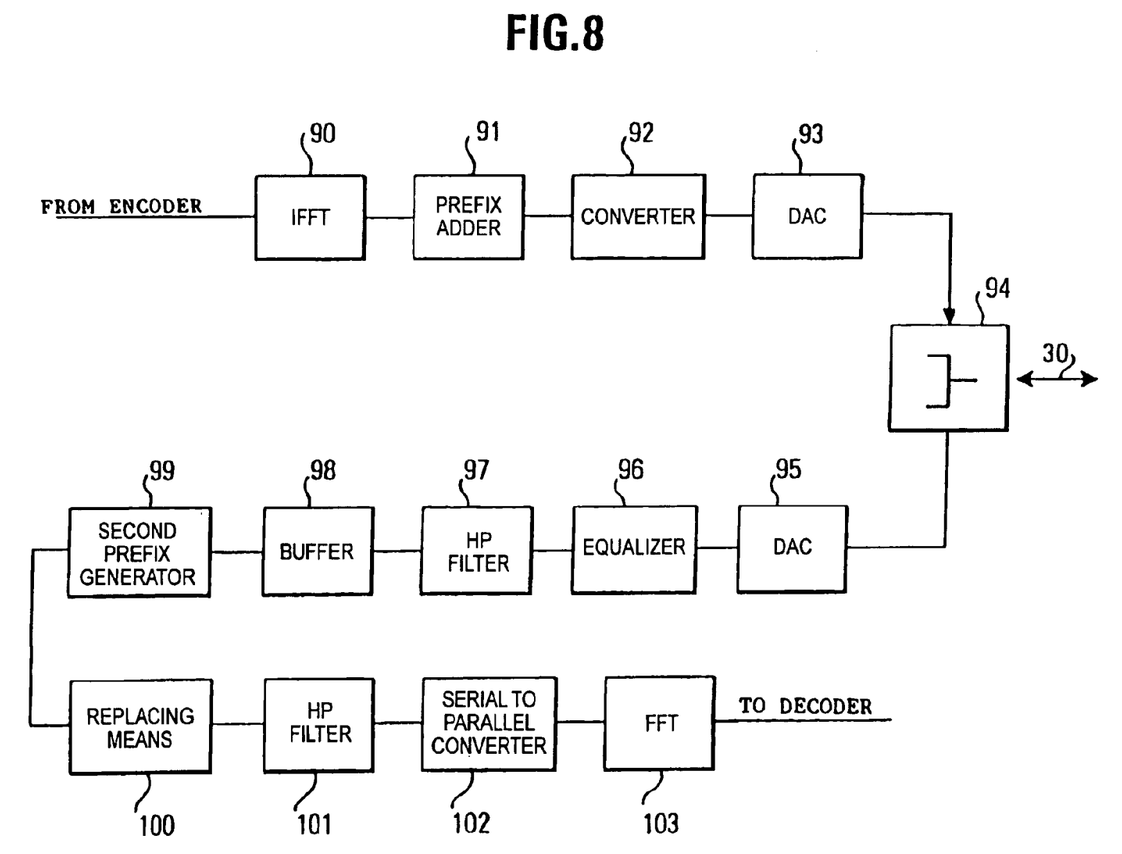
FIG. 8 shows an embodiment of a xDSL modem according to the present invention.

FIG. 8 shows an embodiment of a modem according to the present invention. This modem is for sending and receiving a signal over a transmission path 30. The sent or received signal comprises a plurality of data symbols which are successively transmitted. In front of each of said data symbols is a first prefix for avoiding an interference between successive data symbols caused by transients of said transmission path 30. This signal preferably uses a first frequency band which is different from a second frequency band used by other signals transmitted simultaneously over said transmission path 30. In case of a high speed xDSL system, as discussed in detail in the introductory part of the description, said signal is transmitted in a frequency band starting from 300 kHz up to 10 MHz, and other signals are telephone or ISDN services which are transmitted in a frequency band ranging from 0 to 3 kHz (POTS) or 0 to 160 kHz (ISDN).

For the following description of the modem in FIG. 8 it is assumed that the modem is a DMT xDSL modem. However, it has to be noted that—as apparent to the skilled person—the present invention can also be applied to other transmission systems wherein a signal comprising successively transmitted data signals is sent over a transmission path.

Reference number 90 in FIG. 8 designates an IFFT (Inverse Fast Fourier Transformation) transformation means which converts a set of modulated carriers from an encoder from frequency domain to time domain. This combined set of modulated carriers is a data symbol and is called, in case of a DMT xDSL modem, a DMT-symbol. A first prefix adder 91 is provided for adding a first prefix to each of said data symbols with a length corresponding to the impulse response of the transmission path 30 for avoiding an interference between successively transmitted data symbols caused by transients of said transmission path 30.

A parallel-to-serial converter 92 connected to the output of said prefix adder 90 generates a serial data stream by serializing successive data symbols. The serialized data symbols are then transformed into an analogue signal by a digital-to-analogue converter 93 connected to an output of said parallel-to-serial converter 92. The thereby generated signal is then applied to the transmission path 30 via switching means 94.

Optionally, a digital HP-Filter (not shown) can be provided between said parallel-to-serial converter 92 and said digital-to-analogue converter 93, and an analogue HP-Filter can optionally be provided between said digital-to-analogue converter 93 and said switching means 94 for removing disturbances from the signal applied to said transmission path 30.

Said switching means 94 connects the sending branch of the modem comprising said IFFT transformation means 90, said prefix adder 91, said parallel-to-serial converter 92 and said digital-to-analogue converter 93 to the transmission path 30 if a signal is to be sent from the encoder to said transmission path 30 and connects the transmission path 30 to a receiving branch of said modem, which will be described in the following under the assumption that a signal is sent from a sending side (not shown) to the modem.

If a signal comprising a plurality of data symbols is received over said transmission path 30, said switching means 94 is connecting said transmission path 30 to the receiving branch of the modem. Said received analogue signal is firstly digitized in an analogue-to-digital converter 95, and then input to a time domain equalizer 96, which digitally filters the received data symbols to compensate for intersymbol interference on the transmission path 30.

A first HP filter 97 is connected to the output of the time domain equalizer 96 for removing low frequency disturbances which are not periodic compared to the data symbol length from the received signal. This first HP filter 97 is preferably a nonrecursive HP filter having a finite impulse response. This first HP filter 97 forms a HP filter system together with a second HP filter 101, which is a recursive filter having an infinite impulse response. The nonrecursive HP filter 97 introduces zeros in the transfer function of the HP filter system and attenuates the low frequencies. The recursive HP filter 101 introduces poles into the transfer function of the HP filter system and compensates for the frequency response of the first HP filter 97.

Preferably, the FIR-Filter 60 described with reference to FIG. 5*a*, is used as first HP filter 97 and the IIR-Filter 61 described with reference to FIG. 5*a* as said second HP filter 101.

The output of the first HP filter 97 is input to buffer means 98 for buffering the received signal. Then, means for generating a second prefix 99 are generating a second prefix having a length longer than that of the respective first prefix in front of each of said data symbols.

Said second prefix is preferably generated with a length corresponding to a parameter derived from the impulse response of the filter system constituted by said first HP filter 97 and said second HP filter 101, such that an interference of successive ones of said plurality of data symbols of the received signal caused by transients of said filter system is avoided. This parameter may relate—as already indicated with reference to the first embodiment—to the time until the amplitude of the impulse response of the filter system is reduced to a certain threshold, or shows an attenuation of e.g. 40 dB, after a Dirac impulse was input to the filter system. This parameter may also relate to a time (or time period) after the input of a data symbol after that the transients caused by the data symbol have no adverse effect on the successively input data symbol.

The impulse response is the output time function of the respective system, in this case the filter system, being applied with a Dirac impulse (or unit impulse) having an impulse integral of 1 at the time t=0 at the input.

Replacing means 100 for replacing said first prefix by said second prefix generated in said means 99 for generating a second prefix respectively replace the first prefixes in front of said data symbols by said second prefix.

The output of said replacing means 100 is input to said second HP filter 101. The output of the second HP filter 101 is input to a serial-to-parallel converter 102, which can further be adapted to remove the respective second prefix from the data symbols. The output of said serial-to-parallel converter 102 is then input to a FFT (Fast Fourier Transformation) transformation means 103, which converts the data symbols from the time domain to frequency domain which are then output to a suitable decoder.

Optionally, the receiving branch of said modem may further comprise an analogue high pass filter (not shown) which is arranged between said switching means 94 and said analogue-to-digital converter 95 for removing disturbances from the received signal.

In a variant of said modem, said filter system constituted by said first HP filter 97 and said second HP filter 101 is replaced by a single filter, e.g. of the kind of filter 35 described with reference to FIGS. 1 and 2 which is arranged behind said replacing means 100.

In a further variant, said buffer means 98 comprises a first buffer portion and a second buffer portion similar to the first buffer 41 and the second buffer 42 described with reference to FIGS. 3, 4, 6 and 7 and said modem further comprises a first buffer switching means similar to the first switching means 40 described with reference to FIGS. 3, 4, 6 and 7. Then, the modem further comprises second buffer switching means similar to the second switching means 45 described with reference to FIGS. 3, 4, 6 and 7, either arranged in front of the second HP filter 101 similar to the arrangement shown in FIG. 7, or behind two of said second HP filters 101 similar to the arrangement shown in FIG. 6 or behind two high pass filters such as the HP filters HP 0 and HP 1 described with reference to FIG. 3 if instead of said first HP filter 97 and said second HP filter 101, one part filters such as the HP filters HP 0 and HP 1 are used, similar to the arrangement shown in FIG. 3.

It is noted that, in other embodiments, the above features may be used in combination with each other.

Although the present application has been described with reference to specific embodiments, it has to be noted that the embodiments and examples given above are for illustrative purposes only and for a better understanding of the present inventions and by no means intended to limit the scope of the present invention. Other modifications are clearly possible for a person of ordinary skills in the art without departing from the scope of the present invention as defined in the following claims.

Reference signs are intended for a better understanding and shall not limit the scope.

What is claimed is:

1. A receiver for a high speed transmission system for receiving a first signal over a transmission path, said first signal comprising a plurality of data symbols which are successively transmitted, in front of each of said plurality of data symbols having a first prefix for avoiding an interference between said successively transmitted plurality of data symbols, said receiver comprising:

means for generating a second prefix for each of said first prefix in front of each of said plurality of data symbols; and replacing means for replacing said first prefix, wherein by said second prefix, said second prefix respectively having a length longer than the length of said first prefix to be replaced, a buffer for buffering said first signal;

a filter having a pass characteristic such that said first signal can pass comprising a first filter portion having a finite impulse response introducing zeros in the transfer function of said filter and a second filter portion having an infinite impulse response introducing poles in the transfer function of said filter;

wherein said first filter portion is arranged in front of said replacing means with respect to said transmission path, and said second filter portion behind thereof.

2. A receiver according to claim 1, characterized by receiving a second signal over said transmission path simultaneously with said first signal, said first signal and said second signal having different frequency bands, and said pass characteristic of said filter being such that said second signal is suppressed by said filter.

3. A receiver according to claim 1, characterized in that for a given data symbol, said second prefix is a part of said given data symbol.

4. A receiver according to claim 1, characterized by
said buffer comprising a first buffer portion and a second buffer portion;
a switching means for switching said transmission path to said first and second buffer portions such that successively transmitted ones of said plurality of data symbols are alternately buffered into said first and second buffer portions.

5. A receiver according to claim 1, characterized in that, said means for generating a second prefix with a length corresponding to a parameter derived from said infinite impulse response of said second filter portion such that an interference of successive ones of said plurality of data symbols of said first signal caused by transients of said filter is avoided.

6. A receiver according to claim 1, characterized in that said transmission path is a telephone line and said second signal is a telephone service or an ISDN service, which is transmitted in a frequency band.

7. A modem including the receiver according to claim 1.

8. A method for receiving a signal on a receiving side of a transmission system, said signal comprising data symbols and a first prefix in front of each of said data symbols for avoiding an interference of successively transmitted data symbols, comprising the following steps:

receiving said signal on the receiving side;

buffering said received signal;

generating a second prefix for each of said first prefix in front of each of said data symbols;

replacing said first prefix by said second prefix, said second prefix having a length longer than the length of said first prefix to be replaced;

filtering said signal, where in said first prefix has been replaced by said second prefix, by means of a filter having a pass characteristic such that said received signal can pass, including firstly filtering said received signal with a first filter portion having a finite impulse response (FIR) introducing zeros in the transfer function of said filter before replacing said first prefix with said second prefix and secondly filtering said signal wherein said first prefix has been replaced by said second prefix by means of a second filter portion having an infinite impulse response (IIR) including poles in the transfer function of said filter.

9. A method according to claim 8, characterized in that for a given data symbol, said second prefix is generated by using a part of said given data symbol.

10. A method according to claim 8, characterized in that said buffering of said received signal is performed by switching said transmission path to a first buffer portion and a second buffer portion such that successively received data symbols are alternately stored in said first and second buffer portion.

11. A method according to claim 8, characterized in that said second prefix is generated with a length corresponding to a parameter derived from said infinite impulse response of said second filter portion such that an interference of successive data symbols of said signal caused by transients of said filter is avoided.

* * * * *

UNITED STATES PATENT AND TRADEMARK OFFICE
CERTIFICATE OF CORRECTION

PATENT NO. : 6,870,893 B2  Page 1 of 1
DATED : March 22, 2005
INVENTOR(S) : Tore It is certified that error appears in the above-identified patent and that said Letters Patent is hereby corrected as shown below:

Title page,
Item [63], Related U.S. Application Data, should be -- Continuation of application No. PCT/EP1999/09197, filed on Nov. 26, 1999 --

Signed and Sealed this

Twenty-fourth Day of May, 2005

JON W. DUDAS
*Director of the United States Patent and Trademark Office*